United States Patent
Horie et al.

(10) Patent No.: US 10,664,037 B2
(45) Date of Patent: May 26, 2020

(54) ELECTRONIC DEVICE AND METHOD

(71) Applicant: TOSHIBA CLIENT SOLUTIONS CO., LTD., Koto-ku, Tokyo (JP)

(72) Inventors: Yutaka Horie, Mitaka Tokyo (JP); Katsuhiro Uchida, Ome Tokyo (JP)

(73) Assignee: TOSHIBA CLIENT SOLUTIONS CO., LTD., Tokyo (JP)

(*) Notice: Subject to any disclaimer, the term of this patent is extended or adjusted under 35 U.S.C. 154(b) by 290 days.

(21) Appl. No.: 15/887,764

(22) Filed: Feb. 2, 2018

(65) Prior Publication Data
US 2018/0329473 A1 Nov. 15, 2018

(30) Foreign Application Priority Data
May 12, 2017 (JP) ................. 2017-095910

(51) Int. Cl.
G06F 1/26 (2006.01)
G06F 1/32 (2019.01)
G06F 1/3234 (2019.01)
G06F 1/3206 (2019.01)
G06F 1/3203 (2019.01)

(52) U.S. Cl.
CPC .............. *G06F 1/3234* (2013.01); *G06F 1/26* (2013.01); *G06F 1/263* (2013.01); *G06F 1/266* (2013.01); *G06F 1/32* (2013.01); *G06F 1/3206* (2013.01); *G06F 1/3203* (2013.01)

(58) Field of Classification Search
None
See application file for complete search history.

(56) References Cited

U.S. PATENT DOCUMENTS

| | | | | |
|---|---|---|---|---|
| 2007/0294438 A1* | 12/2007 | Sato | ................... | G01C 21/3688 710/36 |
| 2013/0134787 A1* | 5/2013 | Sakakibara | ........... | H02J 7/0068 307/72 |
| 2013/0342163 A1* | 12/2013 | Naruse | .................. | H02J 7/0036 320/109 |

(Continued)

FOREIGN PATENT DOCUMENTS

JP 10-048279 A 2/1998
JP 2011-242243 A 12/2011

*Primary Examiner* — Tanh Q Nguyen
(74) *Attorney, Agent, or Firm* — Rutan & Tucker, LLP

(57) ABSTRACT

According to one embodiment, an electronic device includes: a first interface and a second interface, each interface being connected with outside of the electronic device to supply power to a connection destination or receive power from a connection destination; a storage configured to store therein first identification information; a transmitter configured to transmit first information containing the first identification information to a first device when the first interface serves as a source to supply power, the first device being the connection destination of the first interface; a receiver configured to receive second information containing second identification information of a second device from the second device when the second interface serves as a sink to receive power, the second device being the connection destination of the second interface; and a controller configured to stop reception of power via the second interface when the second information contains the first identification information.

10 Claims, 3 Drawing Sheets

(56) References Cited

U.S. PATENT DOCUMENTS

2014/0103864 A1\* 4/2014 Song ................. H02J 7/0004
                                                                         320/107
2018/0054067 A1\* 2/2018 Peng .................. H02J 7/007
2018/0329473 A1\* 11/2018 Horie .................. G06F 1/3206

\* cited by examiner

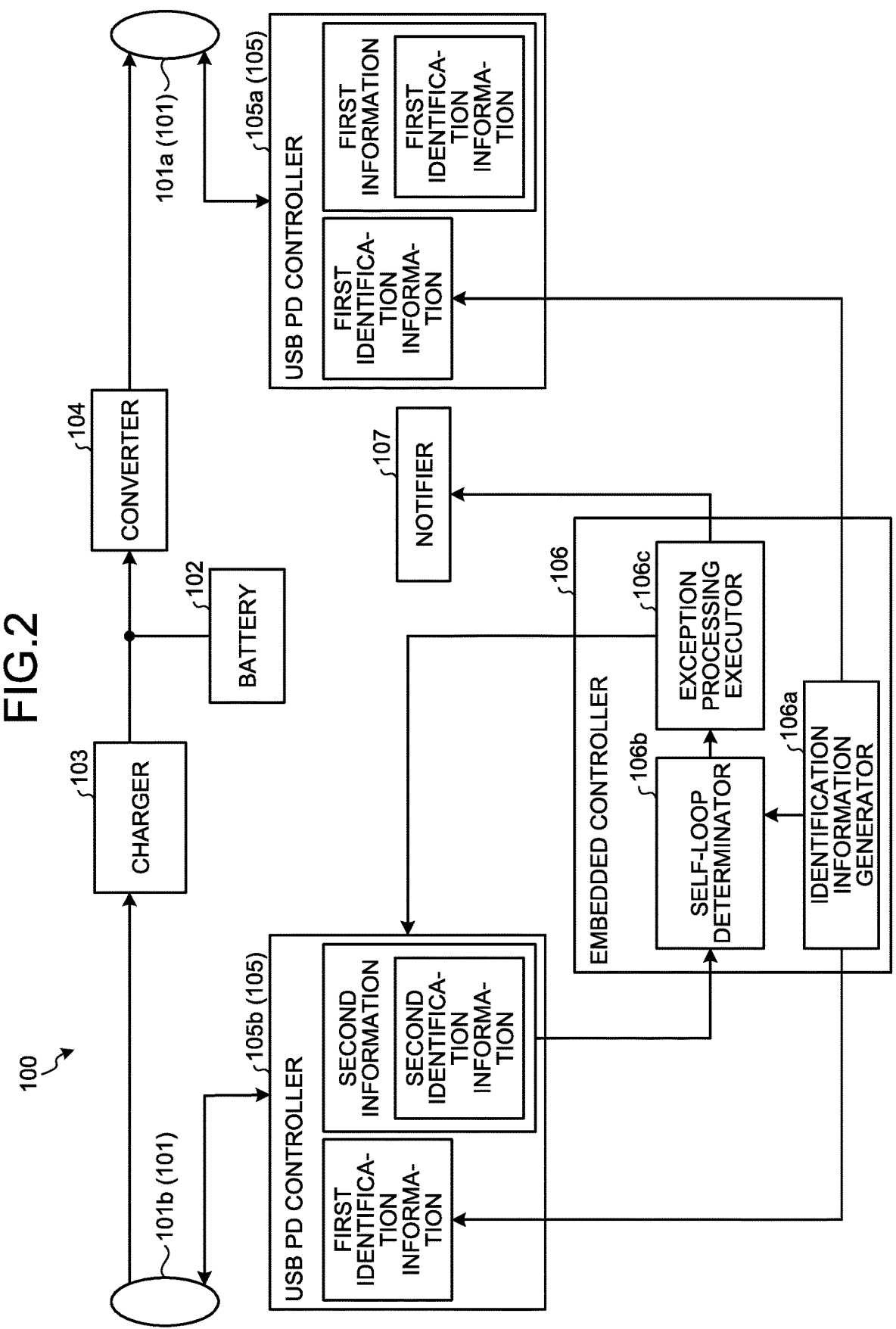

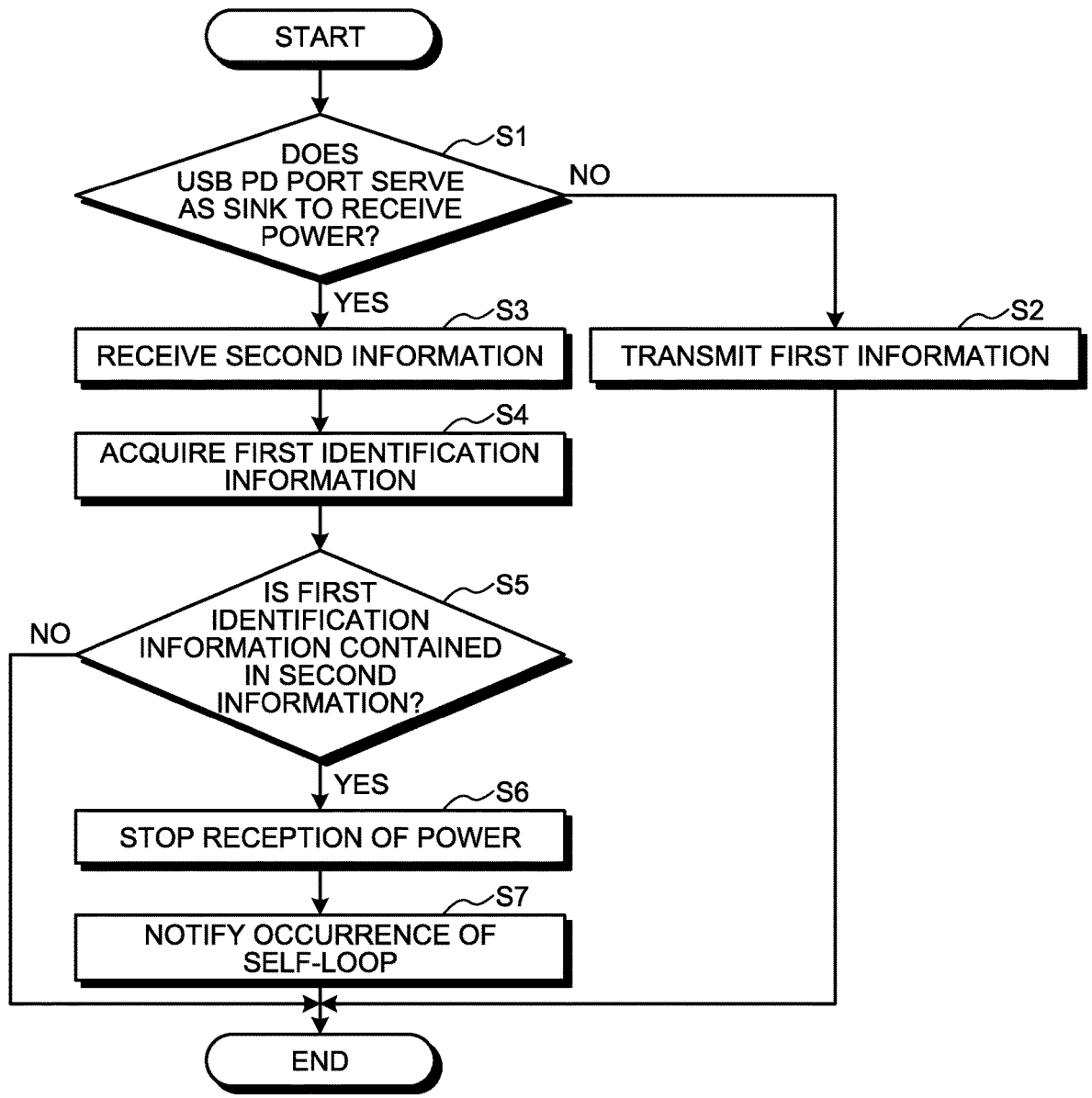

ELECTRONIC DEVICE AND METHOD

CROSS-REFERENCE TO RELATED APPLICATIONS

This application is based upon and claims the benefit of priority from Japanese Patent Application No. 2017-095910, filed on May 12, 2017; the entire contents of which are incorporated herein by reference.

FIELD

Embodiments described herein relate generally to an electronic device and a method executed by the electronic device.

BACKGROUND

Conventionally, there has been known an electronic device including a plurality of interfaces capable of being connected with outside of the electronic device.

In the conventional electronic device as described above, interfaces thereof may be capable of supplying and receiving power.

Under this situation, there may be occurred such that two interfaces are directly connected with each other, for example, via a wire cable, or are indirectly connected with each other as like a daisy chain via one or more other devices and/or wire cables. According to this situation, one of the two interfaces serves as a source to supply power and the other serves as a sink to receive power, and thereby a loop path (self-loop path) of the supplying and receiving power is formed and a wasteful power loss occurs.

Accordingly, it has been desired to reduce the wasteful power loss resulting from the loop path of supplying and receiving power.

BRIEF DESCRIPTION OF THE DRAWINGS

FIG. 2 is an exemplary and schematic block diagram illustrating an internal configuration of the electronic device according to the embodiment;

FIG. 3 is an exemplary diagram illustrating a notification screen of a self-loop according to the embodiment; and FIG. 4 is an exemplary flowchart illustrating processing executed according to the embodiment.

DETAILED DESCRIPTION

Figure 1:
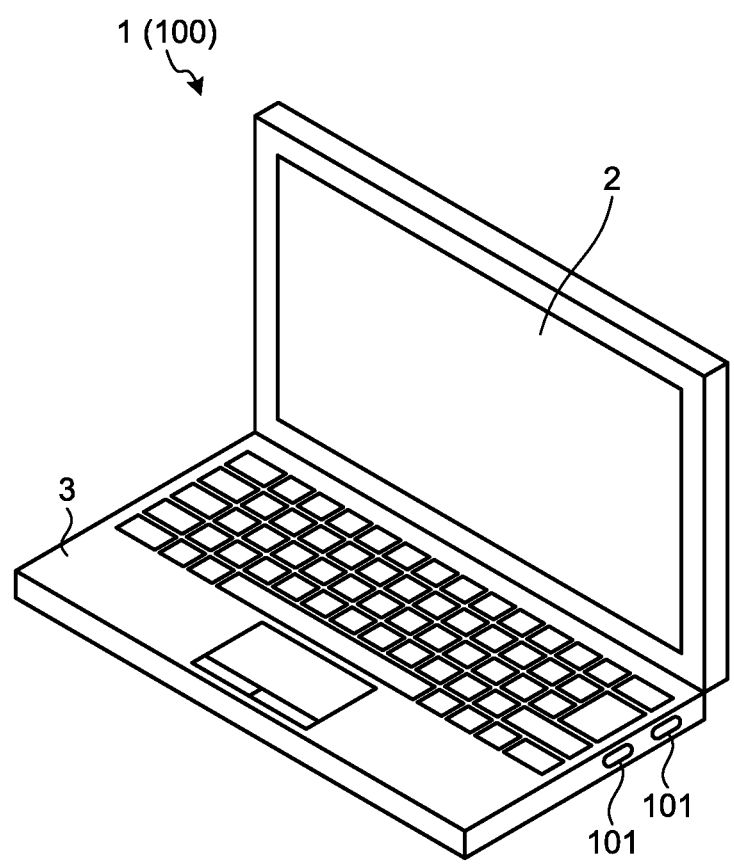
FIG. 1 is an exemplary diagram illustrating appearance of a personal computer (PC) of an electronic device according to an embodiment.

In general, according to one embodiment, an electronic device includes: a first interface and a second interface, each interface capable of being connected with outside of the electronic device to supply power to a connection destination or receive power from a connection destination; a storage configured to store therein first identification information of the electronic device; a transmitter configured to transmit first information containing the first identification information to a first device when the first interface serves as a source to supply power, the first device being the connection destination of the first interface; a receiver configured to receive second information containing second identification information of a second device from the second device when the second interface serves as a sink to receive power, the second device being the connection destination of the second interface; and a controller configured to stop reception of power via the second interface when the second information contains the first identification information.

One embodiment will now be described with reference to the accompanying drawings. The configurations of the embodiment described below, and actions and results (effects) caused by the configurations have been presented by way of example, and are not limited to the contents described below.

FIG. 1 is an exemplary diagram illustrating appearance of a personal computer (PC) 1 of an electronic device 100 according to an embodiment. As illustrated in FIG. 1, the PC 1 of the embodiment includes a display 2 that displays information such as a moving image, and a main body 3 that has a processor and a memory equipped therein and has a keyboard provided thereon. In the embodiment, the main body 3 of the PC 1 is provided with a plurality of universal serial bus power delivery (USB PD) ports 101 (FIG. 1 illustrates two USB PD ports) that comply with the USB PD standard. It is indisputable that the PC 1 has the same configuration as that of a general computer, including the display 2, the main body 3, and the USB PD ports 101. FIG. 1 illustrates one example where there are two USB PD ports, but there may be three or more USB PD ports in the embodiment.

Each of the USB PD ports 101 is an interface that is configured to be capable of being connected with the outside, and supplying/receiving power to/from a connection destination. In other words, when a USB PD port 101 is connected with the outside, the USB PD port 101 can serve as a source that supplies power to the connection destination or serve as a sink that receives power from the connection destination. In general, whether the USB PD port 101 serves as the source or serves as the sink is determined based on negotiation and the like executed between the electronic device 100 and the connection destination.

In the embodiment, any interface other than the USB PD ports 101 may be used if that interface satisfies a condition where the interface is capable of being connected with the outside and the interface is capable of supplying/receiving power to/from a connection destination. As the other embodiment, another electronic device such as a smartphone and a tablet can be applied, in addition to the PC 1 illustrated in FIG. 1.

A device of the connection destination may be any device such as other PC similar but different from the PC illustrated in FIG. 1, a smartphone, a tablet, an electronic recording device, an audio device, and a video device.

In the electronic device 100 such as the PC 1 that includes the plurality of USB PD ports 101, the two USB PD ports 101 may be directly connected to each other via a cable, and may be indirectly connected to each other in a daisy chain via one or more other devices and cables. In this case, one of the two USB PD ports 101 may serve as the source to supply power and the other may serve as the sink to receive power. This situation causes a loop (self-loop) of a path of supply/reception of power and a wasteful power loss.

Under the configurations described below, the electronic device 100 of the embodiment monitors whether the self-loop path of supply/reception of power occurs, and stops, when the self-loop path occurs, the reception of power so as to reduce the wasteful power loss.

FIG. 2 is an exemplary and schematic block diagram illustrating an internal configuration of the electronic device 100 according to the embodiment. FIG. 2 illustrates only the configuration of a part related to the USB PD ports 101 in the electronic device 100. Hereinafter, a USB PD port 101a of the two USB PD ports 101 serves as the source, and a USB PD port 101b of the two USB PD ports 101 serves as the sink. The USB PD port 101a is one example of a "first interface", and the USB PD port 101b is one example of a "second interface".

As illustrated in FIG. 2, the electronic device 100 comprises the two USB PD ports 101 (101a and 101b), a battery 102, a charger 103, a converter 104, two USB PD controllers 105 (105a and 105b), an embedded controller 106, and a notifier 107.

The battery 102 is a chargeable/dischargeable secondary battery. The charger 103 charges the battery 102 with power that is received by the USB PD port 101b serving as the sink. The converter 104 converts (direct-current) power stored in the battery 102 to voltage power of proper magnitude, and outputs the converted power to the USB PD port 101a serving as the source.

Each of the USB PD controllers 105 controls supply/reception of power and transmission/reception of data via the corresponding USB PD port 101. More specifically, Each of the USB PD controllers 105 controls supply of power and transmission of data via the USB PD port 101 when the corresponding USB PD port 101 serves as the source; and each of the USB PD controllers 105 controls reception of power and reception of data via the USB PD port 101 when the corresponding USB PD port 101 serves as the sink. Each of the USB PD controllers 105 includes a processor (not illustrated) that executes various kinds of processing, a memory (not illustrated) that stores therein various kinds of data, and the like.

As described above, it is assumed that the USB PD port 101a serves as the source and the USB PD port 101b serves as the sink. Therefore, in the example of FIG. 2, the USB PD controller 105a corresponding to the USB PD port 101a controls supply of power and transmission of data via the USB PD port 101a, and the USB PD controller 105b corresponding to the USB PD port 101b controls reception of power and reception of data via the USB PD port 101b.

The embedded controller 106 integrally controls the USB PD controllers 105 and the notifier 107. Similarly to the USB PD controllers 105, the embedded controller 106 also includes a processor (not illustrated) that executes various kinds of processing, a memory (not illustrated) that stores therein various kinds of data, and the like.

The embedded controller 106 of the embodiment includes an identification information generator 106a, a self-loop determinator 106b, and an exception processing executor 106c. These configurations may be implemented as a function module generated on the memory as a result of a predetermined control program executed by the processor of the embedded controller 106, and may be implemented by dedicated hardware (circuitry).

The identification information generator 106a generates identification information of the electronic device 100, and writes the generated identification information into the memory of the USB PD controller 105a. The identification information may be, for example, a serial number assigned at the time of manufacturing the electronic device 100, specific information of the electronic device 100 generated based on a predetermined random number, or the like.

In the embodiment, the identification information is used for detecting the self-loop path of supply/reception of power. More specifically, in the embodiment, the identification information is transmitted/received along the path of supply/reception of power in order to detect the self-loop.

That is, in the embodiment, the USB PD controller 105a transmits first information that includes the identification information of the electronic device 100 written into the memory (hereinafter, referred to as first identification information) to a first device (not illustrated) that is the connection destination of the USB PD port 101a at the timing of negotiation before power is actually supplied via the USB PD port 101a. For example, a vender defined message (VDM) defined by the USB PD standard is used for transmitting the first information.

In the embodiment, the USB PD controller 105b receives, from a second device (not illustrated) that is the connection destination of the USB PD port 101b, second information that includes identification information of the second device (hereinafter, referred to as second identification information) at the timing of negotiation before power is actually received via the USB PD port 101b. Similarly to transmission of the first information, a VDM defined by the USB PD standard is used for receiving the second information.

In the embodiment, the USB PD controller 105a contains the second information received by the USB PD controller 105b in the first information to be transmitted to the first device.

In the embodiment, transmission and reception of the first and second information makes it possible to detect the self-loop path of the supply/reception of power generated by directly or indirectly connecting the USB PD port 101a serving as the source and the USB PD port 101b serving as the sink to each other.

For example, it is assumed that the self-loop occurs by directly connecting the USB PD port 101a and the USB PD port 101b to each other. In this case, both of the first device that is the connection destination of the USB PD port 101a, and the second device that is the connection destination of the USB PD port 101b serve as the electronic device 100; and the first identification information in the first information transmitted from the USB PD port 101a and the second identification information in the second information received by the USB PD port 101b are identical.

In other words, in the above-mentioned case, the USB PD controller 105a transmits the first information containing the first identification information from the electronic device 100, and the USB PD controller 105b receives the first information containing the first identification information as the second information containing the second identification information from the electronic device 100. In this case, the second identification information is actually the same as the first identification information. Thus, in this case, whether the self-loop occurs or not can be detected by determining whether the second identification information received by the USB PD controller 105b and the first identification information generated by the identification information generator 106a and written into the memory of the USB PD controller 105b are identical.

Meanwhile, it is assumed that the self-loop occurs by indirectly connecting the USB PD port 101a and the USB PD port 101b to each other in a daisy chain via one or more other devices. Similarly to the electronic device 100 of the embodiment, one or more other devices assumed in this configuration has/have a function of transmitting and receiving the first and second information. In this case, power supplied from the USB PD port 101a serving as the source returns to the USB PD port 101b serving as the sink via one or more devices interposed between the USB PD port 101a and the USB PD port 101b.

As described above, in the embodiment, the USB PD controller 105a contains the second information received by the USB PD controller 105b in the first information to be transmitted to the connection destination of the USB PD port 101a. With this configuration, when the USB PD port 101a and the USB PD port 101b are indirectly connected to each other in a daisy chain via one or more other devices as described above, the first information (containing the first identification information) transmitted from the USB PD port 101a circulates along the path of supply/reception of power, and the first identification information returns to the USB PD port 101b in the end while being contained in the second information. Thus, in this case, the self-loop can be detected by determining whether the first identification information generated by the identification information generator 106a and written into the memory of the USB PD controller 105b is contained in the second information received by the USB PD controller 105b.

Based on the above-mentioned logic, the self-loop determinator 106b of the embodiment determines whether the self-loop occurs based on whether the second information received by the USB PD controller 105b contains the first identification information as the identification information of the electronic device 100. When the second information contains the first identification information, in other words, when the self-loop occurs, the exception processing executor 106c executes exception processing described below.

The exception processing executor 106c stops reception of power via the USB PD port 101b as the exception processing. For example, the exception processing executor 106c outputs a hard reset command to the USB PD controller 105b so as to stop reception of power via the USB PD port 101b until the connection destination of the USB PD port 101b is confirmed again by such handling as removal or insertion of a cable from or to the USB PD port 101b. With this configuration, recurrence of a wasteful power loss resulting from the self-loop can be avoided until the connection destination of the USB PD port 101b is confirmed again.

In addition, the exception processing executor 106c notifies a user of the occurrence of the self-loop by the notifier 107 as the exception processing. This processing can prompt a user to change a connection for avoiding the self-loop. The notifier 107 is, for example, an application to execute display control of a display. The exception processing executor 106c outputs a command indicating that a notification screen 301 described later is displayed to the notifier 107 so as to visually notify the occurrence of the self-loop.

FIG. 3 is an exemplary diagram illustrating the notification screen 301 of the self-loop according to the embodiment. As illustrated in FIG. 3, the notification screen 301 displays a message indicating that the self-loop is detected.

In the embodiment, a method for notifying a user of the occurrence of the self-loop is not limited to a visual method with the notification screen 301 illustrated in FIG. 3. For example, in the embodiment, the occurrence of the self-loop may be notified by an auditory method with voice. Furthermore, in the embodiment, the occurrence of the self-loop may be notified by a method for appealing to both visual sense and auditory sense of a user.

Under the configurations described above, in the embodiment, an operation described later is executed.

FIG. 4 is an exemplary flowchart illustrating processing executed according to the embodiment. The processing flow illustrated in FIG. 4 is executed when connection destinations of the USB PD ports 101 are confirmed and whether each of the USB PD ports 101 serves as the source or serves as the sink is confirmed. As described above, the electronic device 100 may be included in the connection destinations of the USB PD ports 101.

In the processing flow illustrated in FIG. 4, each of the USB PD controllers 105 determines whether the USB PD port 101 with the connection destination confirmed serves as the sink to receive power at S1.

When the USB PD port 101 is determined not to be the sink, in other words, when the USB PD port 101 is determined to be the source to supply power at S1, the processing goes to S2. At S2, the USB PD controller 105 transmits the first information containing the first identification information, which is the identification information of the electronic device 100, to the connection destination of the USB PD port 101 as a destination of power supply.

By contrast, when the USB PD port 101 is determined to be the sink at S1, the processing goes to S3. At S3, the USB PD controller 105 receives from the connection destination of the USB PD port 101 as a source of power supply the second information containing the second identification information, which is the identification information of the connection destination. As described above, the second identification information may be identical with the first identification information.

At S4, the self-loop determinator 106b of the embedded controller 106 acquires the first identification information from the identification information generator 106a. As described above, the first identification information has been written into the memory of the USB PD controller 105a by the identification information generator 106a. Thus, the self-loop determinator 106b may acquire the first identification information from the memory of the USB PD controller 105a at S4.

At S5, the self-loop determinator 106b of the embedded controller 106 determines whether the first identification information acquired at S4 is contained in the second information received at S3.

When the first identification information is determined not to be contained in the second information at S5, it can be determined that the self-loop path of supply/reception of power does not occur. Therefore, in this case, exception processing such as S6 and S7 is not executed. And then, the processing ends.

However, when the first identification information is determined to be contained in the second information, it can be determined that the self-loop path of supply/reception of power occurs. Therefore, in this case, the exception processing executor 106c of the embedded controller 106 stops reception of power via the USB PD controller 105 serving as the sink at S6, as the exception processing, by use of the hard reset command or the like.

At S7, the exception processing executor 106c of the embedded controller 106 notifies a user of occurrence of the self-loop via the notifier 107 by use of, for example, the notification screen 301 illustrated in FIG. 3. And then, the processing ends.

As described above, the electronic device 100 of the embodiment includes: the plurality of USB PD ports 101 as interfaces capable of being connected with the outside and supplying/receiving power to/from connection destinations; and the plurality of USB PD controllers 105 corresponding to the USB PD ports 101.

When the USB PD port 101a as the first interface serves as the source to supply power, the USB PD controller 105a corresponding to the USB PD port 101a serves as a transmitter that transmits, to the first device as the connection destination of the USB PD port 101a, the first information containing the first identification information as the identification information of the electronic device 100. When the USB PD port 101*b* as the second interface serves as the sink to receive power, the USB PD controller 105*b* corresponding to the USB PD port 101*b* serves as a receiver that receives, from the second device as the connection destination of the USB PD port 101*b*, the second information containing the second identification information of the second device.

The electronic device 100 of the embodiment includes the embedded controller 106 as a controller that stops reception of power via the USB PD port 101*b* serving as the sink when the second information contains the first identification information. With this configuration, a wasteful power loss resulting from the occurrence of the self-loop can be reduced.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a first interface and a second interface, each interface capable of being connected with outside of the electronic device to supply power to a connection destination or receive power from a connection destination;
a storage configured to store therein first identification information of the electronic device;
a transmitter configured to transmit first information containing the first identification information to a first device when the first interface serves as a source to supply power, the first device being the connection destination of the first interface;
a receiver configured to receive second information containing second identification information of a second device from the second device when the second interface serves as a sink to receive power, the second device being the connection destination of the second interface; and
a controller configured to stop reception of power via the second interface when the second information contains the first identification information.

2. The electronic device of claim 1, wherein
the controller is configured to stop the reception of power via the second interface until the connection destination of the second interface is confirmed again.

3. The electronic device of claim 1, wherein
the controller is configured to notify occurrence of a loop path of supplying and receiving power by a notifier when the second information contains the first identification information.

4. The electronic device of claim 1, wherein
the transmitter contains the second information in the first information to be transmitted to the first device.

5. The electronic device of claim 1, wherein
the first interface and the second interface comply with the universal serial bus power delivery (USB PD) standard.

6. A method executed by an electronic device that comprises a first interface and a second interface, each interface capable of being connected with outside of the electronic device to supply power to a connection destination or receive power from a connection destination, the method comprising:
storing first identification information of the electronic device;
transmitting first information containing the first identification information to a first device when the first interface serves as a source to supply power, the first device being the connection destination of the first interface;
receiving second information containing second identification information of a second device from the second device when the second interface serves as a sink to receive power, the second device being the connection destination of the second interface; and
stopping reception of power via the second interface when the second information contains the first identification information.

7. The method of claim 6, wherein
the stopping comprises stopping the reception of power via the second interface until the connection destination of the second interface is confirmed again.

8. The method of claim 6, further comprising:
notifying occurrence of a loop path of supplying and receiving power by a notifier when the second information contains the first identification information.

9. The method of claim 6, further comprising
containing the second information in the first information to be transmitted to the first device.

10. The method of claim 6, wherein
the first interface and the second interface comply with the universal serial bus power delivery (USB PD) standard.

* * * * *